Patented May 25, 1943

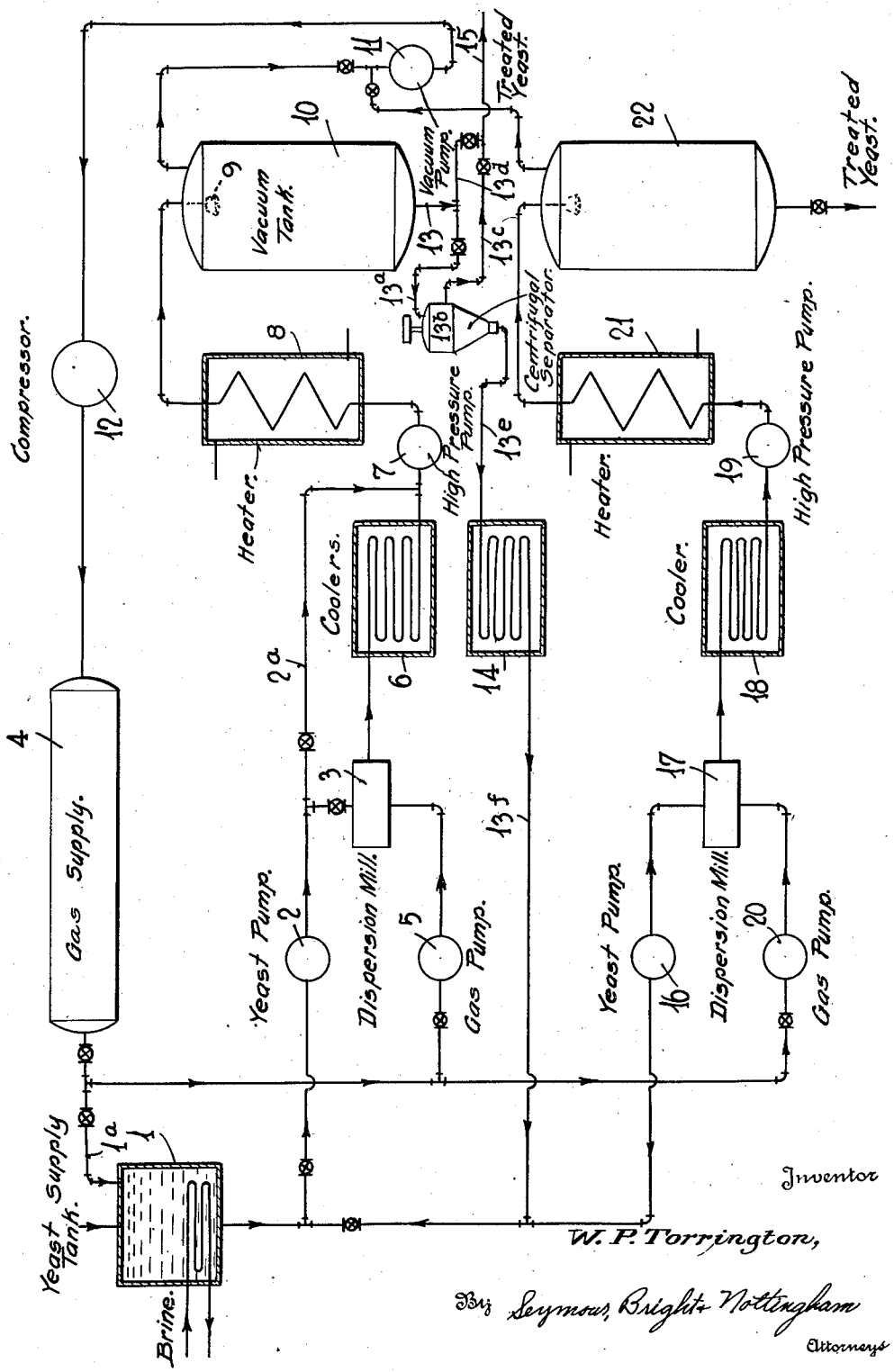

2,319,831

UNITED STATES PATENT OFFICE 2,319,831

YEAST-TREATING PROCESS

William P. Torrington, New York, N. Y., assignor to Emulsions Process Corporation, New York, N. Y., a corporation of Delaware Application August 6, 1940, Serial No. 351,610

16 Claims. (Cl. 99—96)

This invention relates to the treatment of cellular compounds, such as solutions of yeast, and the present application is a development of the system disclosed in my Patent No. 2,190,689 and a continuation-in-part of my application, Serial No. 298,455, filed October 6, 1939, which has matured into Patent No. 2,223,501 dated December 3, 1940.

In accordance with the disclosures of said patent and application, a soluble gas is dispersed in an aqueous yeast solution, with or without the presence of a nutrient, and then the mixture is maintained at subatmospheric temperatures and superatmospheric pressures for a period of time, depending on the starting material and the final product. Subsequently, the mixture is subjected to a high superatmospheric pressure and superatmospheric temperature, and then released into a region of much lower pressure or a vacuum chamber where the gas separates from the solution. Such treatment breaks down or alters the cells of the starting material and releases substances contained within them. Therefore, the process can be employed for various purposes, such as preparing yeast material from which the vitamins can be extracted in their active state, because no destructive temperatures or chemical reagents are employed. In this connection, it will be noted that it is important that the treatment be such as to secure the full benefit of the vitamins in their natural state, unaltered and combined in their relation to each other as they are in the yeast.

The primary purpose of the present invention is to expand the usefulness of the basic process disclosed in such patent and application and to supply a novel method of altering cells of yeast or the like. By my extension of the original method, I can obtain such alteration or rupturing of the cells in a short period of time and by a continuous process. In reference thereto, I have discovered that the desired result may be obtained in a much shorter period of time than in the procedure disclosed in said application, by a cyclic procedure, wherein treated materials derived from the vacuum tank of the system may be recycled through the same or a similar system, a number of times, so as to effectively break down or alter cells surviving a single passage through the system.

My improved method may be practiced in the apparatus disclosed in my prior application, Serial No. 298,455, providing such apparatus is slightly modified. The apparatus so modified is diagrammatically illustrated in the accompanying drawing, which will now be referred to in explaining the details of the process.

In accordance with the present invention, an aqueous solution of yeast, (with or without a nutrient) is introduced into a supply tank 1, from which it is conveyed to a pump 2. The latter puts the solution under a superatmospheric pressure, say about 150 pounds per square inch, before forcing it through a dispersion mill 3 (preferably of the type disclosed in the M. W. Ditto Patent 2,169,339). As the solution enters the dispersion unit, it is mixed with $CO_2$ or its equivalent, the gas being drawn from a source of supply 4 by a pump 5. In the mill, the gas is finely dispersed in the solution, and the mixture is subsequently cooled to about 0° C. as it passes through a cooler 6. In my said prior application, the mixture at this point in the procedure is maintained in a pressure tank for a period of time, for example 48 to 72 hours, depending on the material treated and the results to be obtained. However, in my present procedure, the mixture is withdrawn directly from the cooler by a high pressure pump 7 which increases the pressure on the mixture to an order ranging for example between twenty and one hundred atmospheres, before the mixture is forced into one end of a tubular heater 8. In passing through the latter, the temperature of the mixture may be raised, for example, to approximately 120° F. to 180° F.

After heating, the mixture travels under the last-mentioned pressure and is discharged through a spray head 9 arranged in the vacuum tank 10. As the interior of the tank is maintained under subatmospheric pressure or a vacuum, the $CO_2$ or its equivalent will be released from the mixture and will be withdrawn by a vacuum pump 11. From pump 11 the gas is passed into a compressor 12 which imposes upon it a pressure in excess of that maintained in tank 4 and then returns the gas to that tank. From the vacuum tank the treated solution is withdrawn through pipe 13 from which it may be transferred through a pipe 13a into a centrifugal separator 13b. The latter will separate the supernatant liquid from the residue and such liquid may be discharged through pipes 13c and 15. If the treated solution is not to be recycled, it may be transferred directly from pipe 13 to pipe 15 through a conduit 13d. When the centrifugal separator is used, the residue is passed from the separator through a conduit 13e to a cooler 14 from which it may be returned through a pipe 13f to the pump 2 so that it may be recycled through the system disclosed in application Serial No. 298,455, two or more times.

If an apparatus of the type disclosed in said application is employed in practicing the process, the procedure will be a batch operation and the completely treated yeast or the like will be finally withdrawn from the vacuum tank 10 of the system through the pipe 15. On the other hand, if it is desired to employ a continuous procedure, it is manifest that two or more units (like that illustrated in said application may be used). In such a series system, the partially treated solution withdrawn from the tank 10 can be sent directly to a pump 16 of the second unit, through the dispersion mill 17 and cooler 18, to the high pressure pump 19 of the second unit. Of course, the gas from tank 4 would be forced into the dispersion mill 17 by a pump 20 for admixture with the partially treated solution. The pump 19 would force the solution through the heater 21 of the second unit into the vacuum tank 22 of the latter. Such procedure can be duplicated in a third unit (not shown).

From the foregoing, it will be apparent that in my present treatment, I may eliminate the step of holding the aqueous solution of the yeast with the gas dispersed therein for a prolonged period of time, and instead, recycle the solution, or pass it through the system a number of times, as I have found that a single treatment or passage will alter some of the cells, a second treatment a greater number, and a third will usually be sufficient to prepare the material from which the contents of the cells can be readily extracted.

When I use a detention period of approximately seventy-two hours it is for the purpose of having the yeast undergo a definite reaction when held under pressure of a gas. This reaction is apparently a physiological reaction and proceeds at a very slow rate at very low temperatures. This reaction can be accelerated by operating at slightly higher temperatures during the detention period and I believe that a preferable type of operation may be to apply a shorter detention period at an elevated temperature, this temperature to be reduced just prior to spraying into the vacuum tank so that maximum absorption of the gas can be secured immediately before spraying. Obviously care must be taken that the temperature during this detention period should not be brought above the point that degradation of the yeast would occur. I have found that detention periods of over one hundred hours at temperatures as high as 65° F. have not caused any deterioration of the yeast cells and that they still would reproduce themselves. Naturally, these reactions can be materially increased in rate and can be carried out at lower temperatures by the addition of nutrient to the yeast solution.

Under the vacuum conditions with which I expect to operate, at temperatures in excess of 140° F., there will be a partial release of water vapor which will undoubtedly aid in the disruptive procedure. Of course, if excessive temperatures are used, coagulation, combined with resulting shrinkage of the cells, occurs, whereas at temperatures below 212° F., the temperature would still be sufficiently high to cause vaporization at the vacuum under which I operate, causing alteration unaccompanied by coagulation.

The following are some additional specific examples which may be followed in treating yeast.

*Example No. 1*

An aqueous solution of yeast may be activated in a closed pressure tank 1 by the addition of a nutrient, and then the solution will be held in said tank at a temperature ranging from approximately 30° F. to 50° F. In the tank, I allow the pressure to build up as a result of the fermentation of the yeast to say from 50 to 140 pounds per square inch. After the desired pressure has been reached in the tank 1, the solution can be forced by the pump 2 through a pipe 2*a* to the inlet of the pump 7 which will increase the pressure on the activated yeast solution to between 1000 and 3000 pounds per square inch before the solution is passed through the heater 8, which increases its temperatrue from about 120° F. to 180° F., before it is discharged from this temperature and pressure into vacuum chamber 10. Of course, the gas will be separated from the solution in the tank 10, and I can then centrifugally separate the supernatant liquid from the treated yeast and recycle the residue through the same procedure one or more times.

*Example No. 2*

Nutrient will be added to the yeast solution introduced into the pressure tank 1, and then I can superpose a gas pressure on the solution in said tank, of say from 100 to 150 pounds, while holding the solution at a temperature between 30° F. and 50° F. The gas may be introduced through a pipe 1*a*. This active solution is then subjected to an increase in pressure of from 1000 to 3000 pounds per square inch by the pump 7 and an increase in temperature of from 120° F. to 180° F., in the heater 8. The solution is released from such high pressure and temperature into the vacuum chamber 10; the material treated then being centrifugally separated and the residue being recycled one or more times.

*Example No. 3*

In this procedure, the tank 1 may be open instead of closed, but here also nutrient will be added to the yeast solution. After the solution is activated, I may employ the pump 2 to increase the pressure on the solution from atmospheric up to about 100 to 150 pounds per square inch before the solution is cooled to about 30° F. to 50° F. in the cooler 6. After cooling the pressure is increased by pump 7 to from 1000 to 3000 pounds, and the temperature to 120° F. to 180° F. before the treated material is released into the vacuum chamber 10. The treated material from this chamber may be centrifugally separated and the residue recycled one or more times.

Of course, the dispersion mill should be used in the dispersion of gas in the solution when gas is employed in the procedure.

I have found my new treatment to be particularly advantageous in extracting vitamin B complexes from brewers yeast, and in treating brewers yeast, I may follow the specific procedure outlined in my application Serial No. 298,455, with the exception that the starting material will be passed through the system two or more times instead of being held under a pressure for a prolonged period of time. Obviously, other cellular compounds can be treated by my present procedure or by the process specifically disclosed in the prior application. Other raw materials that may be utilized are liver or other glands, which may be treated to break down their cellular structure in order to release the water soluble or solvent soluble hormone compounds contained within the cells. Also other types of organic cellular materials containing soluble material enclosed within semi-permeable cell walls. In other words, I propose to treat by my present process any solution of a cellular compound amenable to such treatment.

In the operation of this process for the alteration of yeast cells, the procedure will be determined by the end products to be obtained. If the primary purpose is to secure the intercellular enzymes in an active state, the final spraying temperature (obtained in heater 8) will have to be limited to below the inactivation point of the enzymes which is approximately 120° F. On the other hand, if the main purpose is to secure the vitamin B complex and other intercellular material, higher temperatures may be safely used.

My method of procedure provides an operating cycles that is continuous in character and has the added advantage that material not completely treated in the first or second cycle will be altered by additional treatment. The act of centrifugally separating the supernatant liquid between cycles makes it possible to add additional nutrient to the residue and repeat the operation. Supernatant liquid from the various cycles may be combined and concentrated by vacuum to a syrup concentrate or may be spray or drum dried into a powder.

Present within the yeast cell are a large number of separate compounds which it may be desirable to separate. Obviously, a single treatment would not be applicable for the extraction of all these different compounds, and it is an advantage to vary the temperature and pressure at different points in the procedure so that by one operation certain fractions would be secured under low temperature conditions and upon separation or partial separation of these fractions, higher temperatures could then be used on the succeeding cycles whereby through succeeding operations, effective separation of the intercellular yeast material may be secured.

So far as the present invention is concerned, the main factors I wish to emphasize are the facts that in the operation of this process, the basic idea is to break down cellular organic compounds by means of soluble gases under pressure. The subsequent increase in temperature and pressure, and the discharging through the atomizing nozzle into a vacuum zone or region of much lower pressure will alter the cells of the yeast undergoing treatment.

The pressures employed during the various stages of the procedure will vary for different types of compounds, but in the final stage of the process, the pressure should be sufficient so that the release of the solution into the vacuum zone will result in the desired rupturing or cell alteration action.

With reference to temperature in the heaters (8, 21), care should be exercised here so as to secure enzymes or other heat-labile fractions. When operating to secure the B complex as known today under acid conditions, heat as high at 100° C. can be applied for short periods of time without material damage.

Those skilled in the art will understand that the pressure, temperature and time factors will have to be varied to conform with both the material being treated and the product desired. It will therefore be understood that various changes and modifications may be made in the details of the procedure without departing from the spirit of the invention as set forth in the appended claims.

What I claim and desire to secure by Letters Patent is:

1. In a process of the character described, dispersing $CO_2$ in an aqueous yeast solution, subjecting the resultant mixture to a high superatmospheric pressure and superatmospheric temperature, releasing the pressure and introducing the mixture into a vacuum zone where the gas separates from the solution, separating some of the yeast cell contents from the solution, and recycling at least some of the last-mentioned solution through the process.

2. In the treatment of yeast, dispersing $CO_2$ in an aqueous yeast solution, subjecting the resultant mixture to a high superatmospheric pressure and superatmospheric temperature, releasing the pressure and introducing the mixture into a vacuum zone where the gas separates from the solution, separating some of the yeast cell contents from the solution and then repeating such treatment of a portion of the last mentioned solution.

3. In the treatment of yeast, dispersing $CO_2$ in an aqueous yeast solution, and placing the resultant mixture under subatmospheric temperatures and superatmospheric pressures, then subjecting the mixture to a higher superatmospheric pressure and superatmospheric temperature from about 160° F. to 212° F., releasing the pressure and introducing the mixture into a vacuum zone where the gas separates from the solution, separating some of the yeast cell contents from the solution and then repeating such treatment on a portion of the solution.

4. In the treatment of yeast, dispersing $CO_2$ in an aqueous yeast solution and subsequently maintaining the resultant mixture at subatmospheric temperatures and superatmospheric pressures for a period of time, then subjecting the mixture to a higher superatmospheric pressure and superatmospheric temperature from about 160° F. to approximately 212° F., releasing the pressure and introducing the mixture into a vacuum zone where the gas separates from the solution, separating some of the yeast cell contents from the solution and then repeating such treatment on a portion of the solution.

5. In the treatment of yeast, dispersing $CO_2$ in an aqueous yeast solution at a subatmospheric temperature and a superatmospheric pressure, then subjecting the resultant mixture to a higher superatmospheric pressure and superatmospheric temperature from about 160° F. to 212° F., releasing the pressure and introducing the mixture into a vacuum zone where the gas separates from the solution, separating some of the yeast cell contents from the solution, and then retreating at least some of the last-mentioned solution by the same process.

6. In the treatment of yeast, dispersing $CO_2$ in gaseous condition in an aqueous yeast solution and maintaining the resultant mixture at a subatmospheric temperature and a superatmospheric pressure for a short period of time during which the $CO_2$ is in liquid phase, then subjecting the mixture to a higher superatmospheric pressure and superatmospheric temperature from about 160° F. to 212° F., releasing the pressure and introducing the mixture into a vacuum zone where the gas separates from the solution, separating some of the yeast cell contents from the solution, and then retreating at least some of the last-mentioned solution by the same process.

7. In the treatment of yeast, dispersing $CO_2$ in gaseous condition in an aqueous yeast solution and placing the resultant mixture under a subatmospheric temperature and a superatmospheric pressure, then immediately subjecting the mixture to a higher superatmospheric pressure and superatmospheric temperature from about 160° F. to 212° F., releasing the pressure and introducing the mixture into a vacuum zone where the gas separates from the solution, separating some of the yeast cell contents from the solution and then subjecting the last-mentioned solution to the same treatment.

8. In the treatment of yeast, confining an aqueous solution of yeast and a nutrient in a closed pressure chamber at a temperature of from about 30° F. to 50° F. while allowing the pressure in the chamber to build up as a result of the fermenting of the yeast and the generation of $CO_2$ to from about 50 to 140 pounds per square inch, then increasing the pressure on the activated yeast solution to between 1000 and 3000 pounds per square inch, also increasing the temperature of the activated solution from about 120° F. to 180° F., discharging the solution from the region of high temperature and pressure into a vacuum chamber where the $CO_2$ separates from the solution, withdrawing the treated solution from said vacuum chamber, and retreating at least some of the last mentioned solution by the same process.

9. In the treatment of yeast, confining an aqueous solution of yeast and a nutrient in a closed pressure chamber at a temperature of from about 30° F. to 50° F. while allowing the pressure in the chamber to build up as a result of the fermenting of the yeast and the generation of $CO_2$ to from about 50 to 140 pounds per square inch, then increasing the pressure on the activated yeast solution to between 1,000 and 3,000 pounds per square inch, also increasing the temperature of the activated solution from about 120° F. to 180° F., discharging the solution from the region of high temperature and pressure into a vacuum chamber where $CO_2$ separates from the solution, withdrawing the treated solution from said vacuum chamber, centrifugally separating the supernatant liquid from the treated yeast, and recycling the residue through the same procedure.

10. A yeast treating process comprising confining an aqueous yeast solution and a nutrient in a closed chamber, superimposing a gas pressure of from about 100 to 150 pounds per square inch upon the mixture in the chamber while holding said mixture at a temperature between approximately 30° F. to 50° F., then subjecting the mixture to an increase in pressure of from 1,000 to 3,000 pounds per square inch and an increase in temperature of from 120° F. to 180° F., then releasing the temperature and pressure and introducing the mixture into a vacuum chamber where $CO_2$ separates from the mixture, and withdrawing the treated material from said chamber.

11. A yeast treating process comprising confining an aqueous yeast solution and a nutrient in a closed chamber, superimposing a gas pressure of from about 100 to 150 pounds per square inch upon the mixture in the chamber while holding said mixture at a temperature between approximately 30° F. to 50° F., then subjecting the mixture to an increase in pressure of from 1000 to 3000 pounds per square inch and an increase in temperature of from 120° F. to 180° F., then releasing the temperature and pressure and introducing the mixture into a vacuum chamber where $CO_2$ separates from the mixture, withdrawing the treated material from said chamber, centrifugally separating the material withdrawn from the vacuum chamber into a supernatant liquid fraction and a residue fraction, and recycling the residue fraction.

12. A process of treating an aqueous yeast solution comprising mixing said solution with a nutrient and thereby activating the yeast in the solution, dispersing $CO_2$ in the solution, then increasing the pressure on the solution to about 100 to 150 pounds and cooling the solution to a temperature between about 30° F. to 50° F., afterwards increasing the pressure on the solution to from 1000 to 3000 pounds per square inch and the temperature from about 120° F. to 180° F., then discharging the solution from the region of high temperature and pressure into a vacuum chamber, where the gas separates from the solution, separating some of the yeast cell contents from the solution, and then immediately recycling some of the last mentioned solution through the same procedure.

13. A process of treating an aqueous yeast solution comprising mixing said solution with a nutrient and thereby activating the yeast in the solution, dispersing $CO_2$ in the solution, then increasing the pressure on the solution to about 100 to 150 pounds and cooling the solution to a temperature between about 30° F. to 50° F., afterwards increasing the pressure on the solution to from 1000 to 3000 pounds per square inch and the temperature from about 120° F. to 180° F., then dicharging the solution from the region of high temperature and pressure into a vacuum chamber, where the gas separates from the solution, centrifugally separating the treated solution into a supernatant liquid fraction and a residue fraction, and recycling the residue fraction.

14. In the treatment of yeast, holding an aqueous solution of yeast in the presence of a nutrient and in intimate contact with $CO_2$ under a pressure of at least atmospheric and at subatmospheric temperature for a period of time sufficient to render the cell walls easily rupturable, and subsequently, while said gas is finely dispersed therein, increasing the pressure on the activated yeast solution to several atmospheres and the temperature of the solution to at least 100° F., finally transferring the solution from the last-mentioned region of high pressure and temperature into a vacuum zone where gas separates from the solution, separating some of the yeast cell contents from the solution, and then recycling the last mentioned solution through the same procedure.

15. In the treatment of yeast, maintaining $CO_2$ in contact with an aqueous yeast solution at subatmospheric temperatures and superatmospheric pressures for a period of time, then subjecting the resultant mixture to a higher superatmospheric pressure and superatmospheric temperature from about 120° F. to 180° F., releasing the pressure and introducing the mixture into a zone where conditions are such that the $CO_2$ separates from the solution, and immediately after such separation, separating some of the yeast cell contents from the solution and re-treating at least some of the last mentioned solution by the same process.

16. In a process of the character described, dispersing $CO_2$ in an aqueous yeast solution, subjecting the resultant mixture to a high superatmospheric pressure and superatmospheric temperature, releasing the pressure and introducing the mixture into a zone where conditions are such that the gas separates from the solution, separating some of the yeast cell contents from the solution, and recycling at least some of the last mentioned solution through the process.

WILLIAM P. TORRINGTON.